US012689025B2

(12) United States Patent
Choi et al.

(10) Patent No.: US 12,689,025 B2
(45) Date of Patent: Jul. 21, 2026

(54) POSITIVE ELECTRODE ACTIVE MATERIAL FOR LITHIUM SECONDARY BATTERY, PREPARATION METHOD THEREFOR, AND LITHIUM SECONDARY BATTERY COMPRISING SAME

(71) Applicant: ECOPRO BM CO., LTD., Cheongju-si (KR)

(72) Inventors: Moon Ho Choi, Cheongju-si (KR); Gyeong Jae Heo, Cheongju-si (KR); Seung Hyun Choi, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 839 days.

(21) Appl. No.: 17/754,990

(22) PCT Filed: Oct. 19, 2020

(86) PCT No.: PCT/KR2020/014282
§ 371 (c)(1),
(2) Date: Apr. 18, 2022

(87) PCT Pub. No.: WO2021/075942
PCT Pub. Date: Apr. 22, 2021

(65) Prior Publication Data
US 2022/0393153 A1 Dec. 8, 2022

(30) Foreign Application Priority Data

Oct. 18, 2019 (KR) ........................ 10-2019-0130033
Oct. 16, 2020 (KR) ........................ 10-2020-0134483

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0471* (2013.01); *H01M 4/485* (2013.01);
(Continued)

(58) Field of Classification Search
None
See application file for complete search history.

(56) References Cited

U.S. PATENT DOCUMENTS

2004/0018429 A1 1/2004 Kweon et al.
2006/0188781 A1 8/2006 Thackeray et al.
(Continued)

FOREIGN PATENT DOCUMENTS

CN 102056844 A 5/2011
CN 104507865 A 4/2015
(Continued)

OTHER PUBLICATIONS

Yue, Peng, EPO Machine translation of CN108269972A Novel High-voltage lithium cobalt oxide anode material and preparing method therof, 2018, 1-5 (Year: 2018).*
(Continued)

*Primary Examiner* — Nicole M. Buie-Hatcher
*Assistant Examiner* — Krishna R Hammond
(74) *Attorney, Agent, or Firm* — SALIWANCHIK, LLOYD & EISENSCHENK

(57) ABSTRACT

The present invention comprises, in lithium composite oxide particles, an overlithiated oxide having a layered crystal structure and represented by chemical formula 1 below, and comprises a lithium manganese oxide represented by chemical formula 2 below outside the lithium composite oxide particles, wherein the overlithiated oxide included in the particles and the lithium manganese oxide included outside the particles have different Li/IM values. [Chemical formula 1] $rLi_2MnO_3 \cdot (1-r)Li_aNi_xCo_yMn_zM1_{1-(x+y+z)}O_2$ (wherein, in
(Continued)

chemical formula 1, $0<r\le0.6$, $0<a\le1$, $0\le x\le1$, $0\le y<1$, $0\le z<1$, and $0<x+y+z\le1$, and M1 is at least any one selected from Na, K, Mg, Al, Fe, Cr, Y, Sn, Ti, B, P, Zr, Ru, Nb, W, Ba, Sr, La, Ga, Mg, Gd, Sin, Ca, Ce, Fe, Al, Ta, Mo, Se, Zn, Nb, Cu, in, S, B, and Bi) [Chemical formula 2] $Li_bMn_pO_q$ (wherein, in chemical formula 2, $0.1\le b/p\le2.5$ and $0<q\le15$).

9 Claims, 12 Drawing Sheets

(51) Int. Cl.

| | | |
|---|---|---|
| *H01M 4/04* | (2006.01) | |
| *H01M 4/485* | (2010.01) | |
| *H01M 4/505* | (2010.01) | |
| *H01M 4/525* | (2010.01) | |
| *H01M 10/0525* | (2010.01) | |

(52) U.S. Cl.
CPC .......... *H01M 4/505* (2013.01); *H01M 4/525* (2013.01); *H01M 10/0525* (2013.01); *H01M 2004/028* (2013.01)

(56) References Cited

U.S. PATENT DOCUMENTS

| | | | |
|---|---|---|---|
| 2010/0308278 A1 | 12/2010 | Kepler et al. | |
| 2011/0052981 A1 | 3/2011 | Lopez et al. | |
| 2012/0064411 A1 | 3/2012 | Lee et al. | |
| 2014/0045067 A1* | 2/2014 | Cho .................. | C01G 45/1235 |
| | | | 429/231.95 |
| 2014/0087263 A1 | 3/2014 | Matsumoto et al. | |
| 2014/0106222 A1 | 4/2014 | Park et al. | |
| 2014/0131616 A1* | 5/2014 | Sun ...................... | H01M 4/523 |
| | | | 252/182.1 |
| 2014/0141331 A1 | 5/2014 | Lee et al. | |
| 2014/0162126 A1 | 6/2014 | Cho et al. | |
| 2014/0162127 A1 | 6/2014 | Kim et al. | |
| 2014/0242468 A1 | 8/2014 | Song et al. | |
| 2015/0030928 A1 | 1/2015 | Kwak et al. | |
| 2015/0325846 A1 | 11/2015 | Kitagawa et al. | |
| 2016/0181605 A1 | 6/2016 | Li et al. | |
| 2016/0190555 A1 | 6/2016 | Kapylou et al. | |
| 2016/0254539 A1 | 9/2016 | Kagei et al. | |
| 2017/0012284 A1 | 1/2017 | Bugga et al. | |
| 2017/0133676 A1 | 5/2017 | Kodato et al. | |
| 2018/0323435 A1 | 11/2018 | Lim et al. | |
| 2019/0074512 A1 | 3/2019 | Choi et al. | |
| 2019/0341609 A1 | 11/2019 | Endo et al. | |
| 2020/0161650 A1 | 5/2020 | Park et al. | |
| 2020/0303720 A1 | 9/2020 | Jo et al. | |
| 2020/0313157 A1 | 10/2020 | Johnson et al. | |
| 2021/0119208 A1 | 4/2021 | Choi et al. | |
| 2021/0226205 A1 | 7/2021 | Park et al. | |
| 2022/0388864 A1 | 12/2022 | Choi et al. | |
| 2022/0411282 A1 | 12/2022 | Choi et al. | |

FOREIGN PATENT DOCUMENTS

| | | | | |
|---|---|---|---|---|
| CN | 104617304 A | 5/2015 | | |
| CN | 104979554 A | 10/2015 | | |
| CN | 105470493 A | 4/2016 | | |
| CN | 105612124 A | 5/2016 | | |
| CN | 106797049 A | 5/2017 | | |
| CN | 108172773 A | 6/2018 | | |
| CN | 108269972 A * | 7/2018 | ............ | H01M 4/366 |
| CN | 108886144 A | 11/2018 | | |
| EP | 2763220 A2 | 8/2014 | | |
| EP | 3819262 A1 | 5/2021 | | |
| JP | 1998069910 A | 3/1998 | | |
| JP | 2005251716 A * | 9/2005 | | |
| JP | 2006012426 A | 1/2006 | | |
| JP | 2011070789 A | 4/2011 | | |
| JP | 2011171113 A | 9/2011 | | |
| JP | 2012138352 A | 7/2012 | | |
| JP | 2012190772 A | 10/2012 | | |
| JP | 2014041720 A | 3/2014 | | |
| JP | 2014513392 A | 5/2014 | | |
| JP | 2014222607 A | 11/2014 | | |
| JP | 2015122235 A | 7/2015 | | |
| JP | 2015130273 A | 7/2015 | | |
| JP | 2016139569 A | 8/2016 | | |
| JP | 2017010841 A | 1/2017 | | |
| JP | 2018508929 A | 3/2018 | | |
| JP | 6315404 B2 | 4/2018 | | |
| JP | 2019091692 A | 6/2019 | | |
| KR | 20120089845 A | 8/2012 | | |
| KR | 10-20130001703 A | 1/2013 | | |
| KR | 20130001703 A * | 1/2013 | | |
| KR | 20130058590 A | 6/2013 | | |
| KR | 20130117338 A | 10/2013 | | |
| KR | 20140025102 A | 3/2014 | | |
| KR | 20140048456 A | 4/2014 | | |
| KR | 20150014884 A | 2/2015 | | |
| KR | 101520634 B1 | 5/2015 | | |
| KR | 20150145736 A | 12/2015 | | |
| KR | 20160032246 A | 3/2016 | | |
| KR | 20160039983 A * | 4/2016 | | |
| KR | 20160044698 A | 4/2016 | | |
| KR | 20160123406 A | 10/2016 | | |
| KR | 20170063387 A | 6/2017 | | |
| KR | 20170080104 A | 7/2017 | | |
| KR | 20190008156 A | 1/2019 | | |
| KR | 10-20190046617 A | 5/2019 | | |
| KR | 20190110551 A * | 9/2019 | | |
| WO | 2011031546 A2 | 3/2011 | | |
| WO | 2013002457 A1 | 1/2013 | | |
| WO | 2015053357 A1 | 4/2015 | | |
| WO | 2016053056 A1 | 4/2016 | | |
| WO | 2017051338 A1 | 3/2017 | | |
| WO | 2018038037 A1 | 3/2018 | | |
| WO | 2018043669 A1 | 3/2018 | | |
| WO | WO-2018137942 A1 * | 8/2018 | ........ | H01M 10/0525 |

OTHER PUBLICATIONS

Extended European Search Report dated Nov. 23, 2023 in European Application No. 20876679.0.

Xie, Y. et al. "Improving the rate capability and decelerating the voltage decay of Li-rich layered oxide cathodes by constructing a surface-modified microrod structure," Journal of Alloys and Compounds, 2019, 772:230-239.

Zhao, J. et al. "Tailorable electrochemical performance of spinel cathode materials via in-situ integrating a layered Li2MnO3 phase for lithium-ion batteries," Journal of Power Sources, 2016, 333:43-52.

Wu, F. et al. "Can surface modification be more effective to enhance the electrochemical performance of lithium rich materials?" Journal of Materials Chemistry, 2012, 22:1489-1497.

Extended European Search Report dated Nov. 17, 2023 in European Application No. 20877964.5.

Extended European Search Report dated Nov. 17, 2023 in European Application No. 20877965.2.

International Search Report dated Feb. 3, 2021 in International Application No. PCT/KR2020/014280.

International Search Report dated Mar. 15, 2021 in International Application No. PCT/KR2020/014281.

Third Party Observation dated Nov. 8, 2023 in European Application No. 20202300.8.

Third Party Observation dated Sep. 19, 2023 in European Application No. 20202300.8.

Office Action dated Aug. 11, 2022 in U.S. Appl. No. 17/072,721.

Office Action dated Jun. 14, 2023 in U.S. Appl. No. 17/072,721.

Office Action dated Apr. 2, 2024 in Japanese Application No. 2022-130624.

Office Action dated Feb. 14, 2022 in Korean Application No. 10-2020-0078294.

Office Action dated Jan. 17, 2024 in Chinese Application No. 202080072959.X.

(56)　　　　　References Cited

OTHER PUBLICATIONS

Office Action dated Jan. 6, 2024 in Korean Application No. 10-2023-0093098.

Office Action dated Jan. 6, 2024 in Korean Application No. 10-2023-0128987.

Office Action dated Jul. 28, 2023 in Chinese Application No. 202080073047.4.

Office Action dated Mar. 1, 2024 in Chinese Application No. 202080073047.4.

Office Action dated Mar. 12, 2024 in Chinese Application No. 202011109592.2.

Office Action dated May 23, 2023 in Japanese Application No. 2022-523072.

Office Action dated May 23, 2023 in Japanese Application No. 2022-523167.

Office Action dated Nov. 15, 2023 in Korean Application No. 10-2023-0044072.

Office Action dated Nov. 23, 2021 in Korean Application No. 10-2020-0051074.

Office Action dated Oct. 12, 2022 in Korean Application No. 10-2020-0135029.

Office Action dated Oct. 5, 2021 in Japanese Application No. 2020-174737.

Office Action dated Sep. 19, 2023 in Chinese Application No. 202011109592.2.

Office Action dated Sep. 24, 2022 in Korean Application No. 10-2020-0134483.

Ding, W. "Synthesis and modification of high voltage ternary cathode materials for lithium-ion batteries" Metallurgical Industry Press, Mar. 2019, p. 12.

Ding, Z. et al. "Stable heteroepitaxial interface of Li-rich layered oxide cathodes with enhanced lithium storage" Energy Storage Materials. 2019, vol. 21, pp. 69-76.

Kong, J-Z. et al. "Li-ion-conductive $Li_2TiO_3$-coated $Li[Li0.2Mn0.51Ni0.19Co0.I]O_2$ for high-performance cathode material in lithium-ion battery", J Solid State Electrochem, 2016, vol. 20, No. 5, pp. 1435-1443.

Li, X. et al. "Effect of niobium doping on the microstructure and electrochemical properties of lithium-rich layered Li [Li0.2Ni0.2Mn0.6]O_2 as cathode materials for lithium ion batteries" RSC Adv., 2015, 5:45351-45358.

Ma, J. et al. "A highly homogeneous nanocoating strategy for Li-rich Mn-based layered oxides based on chemical conversion", Journal of Power Sources, EPUB Dec. 2, 2014, vol. 277, pp. 393-402.

Makhonina, E.V. et al., "Li-rich and Ni-rich transition metal oxides: Coating and core-shell structures," Applied Surface Science, 2019, 474:25-33.

Qiao, Q.Q. et al., "Surface modification of Li-rich layered $Li(Li0.17Ni0.25Mn0.58) O_2$ oxide with Li—Mn—PO4 as the cathode for lithium-ion batteries," Journal of Materials Chemistry A, 2013, 1:5262-5268.

Seu, C.S. et al., "Aluminum Borate Coating on High-Voltage Cathodes for Li-Ion Batteries," Journal of the Electrochemical Society, 2015, 162(12):A2259-A2265.

Wu, Y. et al. "Simultaneous surface coating and chemical activation of the Li-rich solid solution lithium rechargeable cathode and its improved performance", Electrochimica Acta, 2013, vol. 113, pp. 54-62.

Zhang, J. et al. "New insights into the modification mechanism of Li-rich $Li1.2Mn0.6Ni0.2O_2$ coated by $Li_2ZrO_3$", Physical Chemistry Chemical Physics, 2016, vol. 18, No. 19, pp. 13322-13331.

Zhao, E. et al. "Facile synthesis and enhanced electrochemical performances of $Li_2TiO_3$-coated lithium-rich layered $Li1.13Ni0.30Mn0.57O_2$ cathode materials for lithium-ion batteries", Journal of Power Sources, 2015, vol. 294, pp. 141-149.

Zhao, Y. et al. "Surface structural transition induced by gradient A polyanion-doping in Li-rich layered oxides: implications for enhanced electrochemical performance" Advanced Functional Materials. 2016, vol. 26, pp. 4760-4767.

International Search Report dated Mar. 8, 2021 in International Application No. PCT/KR2020/014282.

Office Action dated May 2, 2023 in Japanese Application No. 2022-523166.

Office Action dated Jun. 6, 2023 in Chinese Application No. 202080072966.X.

Office Action dated Oct. 15, 2024 in Japanese Application No. 2023-201270.

Longo, R.C. et al. "Core-Shell Nanocomposites for Improving the Structural Stability of Li-Rich Layered Oxide Cathode Materials for Li-Ion Batteries" ACS Appl. Mater. Interfaces, 2018, 10:19226-19234.

Office Action dated Feb. 25, 2025 in Japanese Application No. JP 2023-215143 (with English translation).

Office Action dated Sep. 2, 2025 in Japanese Application No. 2024-107739 (with English translation).

Office Action dated Oct. 24, 2025 in U.S. Appl. No. 17/754,989.

* cited by examiner

FIG. 2

Core : Mn poor
Surface : Mn rich

POSITIVE ELECTRODE ACTIVE MATERIAL FOR LITHIUM SECONDARY BATTERY, PREPARATION METHOD THEREFOR, AND LITHIUM SECONDARY BATTERY COMPRISING SAME

CROSS-REFERENCE TO RELATED APPLICATIONS

This application is the U.S. national stage application of International Patent Application No. PCT/KR2020/014282, filed Oct. 19, 2020, which claims the benefit under 35 U.S.C. § 119 of Korean Application Nos. 10-2019-0130033, filed Oct. 18, 2019; and 10-2020-0134483, filed Oct. 16, 2020; the disclosures of each of which are incorporated herein by reference in their entirety.

TECHNICAL FIELD

The present invention relates to a cathode active material for a lithium secondary battery that contains overlithiated oxide having a layered crystal structure inside lithium composite oxide particles, and has an excess or deficiency of lithium concentration and metal concentration outside the lithium composite oxide particles, a method for preparing the same, and a lithium secondary battery containing the same.

BACKGROUND ART

The development of portable mobile electronic devices, such as mobile phones, MP3 players, and tablet PCs, has brought about an explosive increase in the demand for secondary batteries capable of storing electrical energy. In particular, with the advent of electric vehicles, medium- and large-sized energy storage systems, and portable devices requiring high energy density, the demand for lithium secondary batteries has increased.

A cathode active material that has recently been in the spotlight is lithium nickel manganese cobalt oxide $Li(Ni_x Co_y Mn_z)O_2$ (wherein x, y, and z are each independently atomic fractions of oxide-constituting elements, and satisfy $0<x\leq1$, $0<y\leq1$, $0<z\leq1$, and $0<x+y+z\leq1$). This cathode active material has an advantage of achieving high capacity because it is used at a higher voltage than $LiCoO_2$, which has been actively researched and used as a cathode active material, and has another advantage of being inexpensive due to the relatively low Co content thereof. However, this material has disadvantages of unsatisfactory rate capability and poor lifetime characteristics at high temperatures.

Accordingly, research has been conducted to apply over-lithiated layered oxide (OLO), which exhibits a higher reversible capacity than conventional $Li(Ni_x Co_y Mn_z)O_2$, to a lithium secondary battery.

However, there are problems of decreased discharge capacity (cycle life) and voltage decay during lifetime cycling, which is due to phase transition from a spinel-like structure to a cubic structure due to transition metal migration during lifetime cycling. These decreased discharge capacity (cycle life) and voltage decay are problems that must be solved in order to realize practical application to a lithium secondary battery.

DISCLOSURE

Technical Problem

In view of these problems, it is one object of the present invention to suppress the phase transition during lifetime cycling, to thereby increase the charge/discharge capacity and solve the problems of reduced lifespan and voltage decay.

It is another object of the present invention to increase lithium ion mobility and improve rate capability based on a phase formed outside overlithiated layered oxide.

It is another object of the present invention to increase the energy density and decrease the specific surface area of particles compared to conventional polycrystalline overlithiated layered oxide, and to thereby improve the internal structural stability of the particles.

Technical Solution

In accordance with one aspect of the present invention, the above and other objects can be accomplished by the provision of a cathode active material for a secondary battery containing lithium composite oxide particles, over-lithiated oxide represented by Formula 1 below and having a layered crystal structure inside the lithium composite oxide particles, and lithium manganese oxide represented by Formula 2 below outside the lithium composite oxide particles, wherein, when a ratio of a number of moles of lithium (Li) to a total number of moles of metal (M) excluding lithium is defined as Li/M, the overlithiated oxide comprised inside the lithium composite oxide particles and the lithium manganese oxide comprised outside the lithium composite oxide particles have different values of Li/M.

$$rLi_2MnO_3\cdot(1-r)Li_a Ni_x Co_y Mn_z M1_{1-(x+y+z)}O_2 \qquad \text{[Formula 1]}$$

wherein r, a, x, y, and z satisfy $0<r\leq0.6$, $0<a\leq1$, $0\leq x\leq1$, $0\leq y<1$, $0\leq z<1$, and $0<x+y+z\leq1$, and M1 includes at least one selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Cu, In, S, B, Ge, Si, and Bi.

$$Li_b Mn_p O_q \qquad \text{[Formula 2]}$$

wherein b, p and q satisfy $0.1\leq b/p\leq2.5$, and $0<q\leq15$.

In addition, the cathode active material for a secondary battery according to an embodiment of the present invention may have a lithium concentration gradient from the inside to the outside of the lithium composite oxide particles.

In addition, the cathode active material for a secondary battery according to an embodiment of the present invention may have a manganese concentration gradient from the inside to the outside of the lithium composite oxide particles.

In accordance with another aspect of the present invention, provided is a method of preparing a cathode active material for a secondary battery including forming precursor particles for forming an inside of the cathode active material, mixing the formed precursor particles with a lithium compound and performing primary heat treatment, dispersing the primarily heat-treated particles in distilled water or an alkaline aqueous solution and then coating the particles with a compound containing manganese to form the outside of the cathode active material, and mixing the coated particles with a lithium compound and performing secondary heat treatment.

In accordance with another aspect of the present invention, provided is a secondary battery containing the cathode active material.

Advantageous Effects

The cathode active material according to the embodiment of the present invention has increased charge/discharge capacity, and solves the problems of reduced lifespan and voltage decay.

In addition, lithium ion mobility is increased and the rate characteristics are improved due to the phase formed on the outside of the overlithiated layered oxide.

In addition, the internal structural stability of the particles is improved.

DESCRIPTION OF DRAWINGS

FIG. 2 is a conceptual diagram of a cathode active material according to Example 1 of the present invention.

FIG. 10 shows a comparison in rate characteristics between secondary batteries according to Comparative Example and Examples of the present invention.

FIG. 12 shows a comparison in voltage retention rate between secondary batteries according to Comparative Example and Examples of the present invention.

BEST MODE

Figure 1:
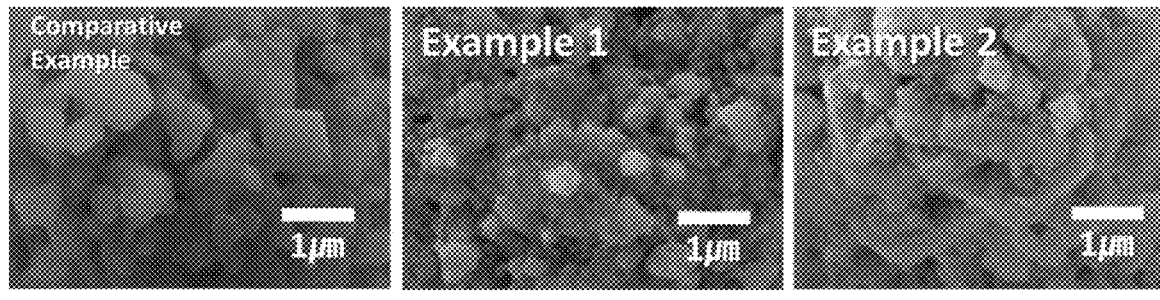
FIG. 1 shows SEM images of cathode active materials according to Examples and Comparative Examples of the present invention.

As used herein, terms such as "comprising" should be understood as open-ended terms that do not preclude the inclusion of other elements.

As used herein, the terms "preferred" and "preferably" refer to embodiments of the present invention that may provide certain advantages in specific environments, and are not intended to exclude other embodiments from the scope of the invention.

The cathode active material for a secondary battery according to an embodiment of the present invention contains lithium composite oxide particles and overlithiated oxide represented by Formula 1 below and having a crystal layered structure inside the lithium composite oxide particles.

$$rLi_2MnO_3 \cdot (1-r)Li_aNi_xCo_yMn_zM1_{1-(x+y+z)}O_2 \quad \text{[Formula 1]}$$

(In Formula 1, r, a, x, y, and z satisfy $0<r\leq0.6$, $0<a\leq1$, $0\leq x\leq1$, $0\leq y<1$, $0\leq z<1$, and $0<x+y+z\leq1$, and M1 includes at least one selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Nb, Cu, In, S, B, and Bi.)

The overlithiated layered oxide of the layered structure may be a solid solution phase in which $Li_2MnO_3$ having a monoclinic structure is mixed with $LiMO_2$ having a rhombohedral structure, wherein M may include at least one selected from Ni, Co, Mn, and M1.

In addition, in the overlithiated layered oxide of the layered structure, a plateau attributable to $Li_2MnO_3$ may appear at 4.4 V in the initial charge/discharge profile.

The cathode active material may have a layered structure in which a lithium atomic layer and a metal atomic layer of Ni, Co, Mn, or M1 alternately overlap each other via an oxygen atomic layer.

The plane forming the layer in the layered structure of the cathode active material may have a crystal orientation in a direction perpendicular to the C axis. In this case, the mobility of lithium ions contained in the cathode active material is improved and the structural stability of the cathode active material is improved, and thus initial capacity characteristics, output characteristics, resistance characteristics, and long-term lifetime characteristics are improved upon application to a battery.

When a ratio of the number of moles of lithium to the total number of moles of metals (M) excluding lithium is defined as Li/M, the Li/M inside the lithium composite oxide particles may be 1.1 to 1.6, 1.2 to 1.6, 1.3 to 1.6, or 1.4 to 1.5.

In Formula 1, x may be more than 0 and not more than 0.5, more than 0 and not more than 0.4, more than 0 and not more than 0.3, more than 0 and not more than 0.2, or more than 0 and not more than 0.1.

In Formula 1, y may be more than 0 and not more than 0.5, more than 0 and not more 0.4, more than 0 and not more than 0.3, more than 0 and not more than 0.2, or 0.1 to 0.2.

As an example, the ratio (Mn/Ni) of the number of moles of manganese to the total number of moles of nickel inside the lithium composite oxide particles may be 1 to 4.5, 2 to 4, or 3 to 4.

In Formula 1, M1 includes at least one selected from Na, K, Mg, Al, Fe, Cr, Y, Sn, Ti, B, P, Zr, Ru, Nb, W, Ba, Sr, La, Ga, Mg, Gd, Sm, Ca, Ce, Fe, Al, Ta, Mo, Sc, V, Zn, Cu, In, S, B, Ge, Si, and Bi.

In a more preferable embodiment, M1 may be a dopant that acts as a flux to grow the primary particles. The term "acting as a flux" means that a substance can act as a dopant that increases the size of the primary particles.

More preferably, M1 may include at least one selected from Ba, Sr, B, P, Y, Zr, Nb, Mo, Ta, and W, which further grow primary particles to more suitably adjust the size thereof to a predetermined range, most preferably at least one selected from Nb and Ta.

For example, M1 may be present in an amount of 0.01 to 3 mol %, more preferably 0.1 to 1 mol %, based on the total amount of the overlithiated layered oxide. When the content of dopant M1 as a flux inducing the growth of primary particles exceeds the above range, lithium composite oxide may be produced in excess, which may decrease capacity and efficiency, and when the content is less than the above range, the effect of growing primary particles may be insufficient.

The cathode active material according to an embodiment of the present invention contains lithium manganese oxide represented by Formula 2 outside the lithium composite oxide particles.

$$Li_bMn_pO_q \quad \text{[Formula 2]}$$

(In Formula 2, b, p and q satisfy $0.1<b/p<2.5$, and $0<q<15$).

As an example, the value of b/p, which signifies Li/M outside the lithium composite oxide particles, may be 0.1 to 0.9, more preferably 0.3 to 0.9, and more preferably 0.5 to 0.8.

In this case, the lithium manganese oxide may be $Li_4Mn_5O_{12}$ or $LiMn_2O_4$.

Also, for example, the value of b/p may be 1.8 to 2.5, more preferably 1.9 to 2.1.

In this case, the lithium manganese oxide may be $Li_2MnO_3$.

According to the present invention, the inner structure of the lithium manganese oxide is made different from the outer structure thereof by adding Li after coating with a Mn-containing material to form the outer structure of lithium manganese oxide having a spinel crystal structure or a layered structure with an excess of lithium.

In the cathode active material according to an embodiment of the present invention, when the ratio of the number of moles of lithium (Li) to the total number of moles of metal (M) excluding lithium is Li/M, Li/M of the overlithiated oxide contained in the inner area of the lithium composite oxide particles is different from Li/M of the lithium manganese oxide contained in the outer area of the lithium composite oxide particles.

Overlithiated layered oxide has problems of decreased discharge capacity (cycle life) and voltage decay during cycling. The rate characteristics can be improved by a phase formed based on excessive or deficient lithium concentration and metal concentration outside the lithium composite oxide particles.

The cathode active material according to the present invention is capable of inhibiting the elution of Mn from an oxide containing large amounts of lithium and manganese and is capable of improving lifetime, reducing discharge capacity, and inhibiting voltage decay by suppressing a lattice change to a rock-salt phase from a spinel phase occurring from the surface of the cathode active material during cycling.

Figure 2:
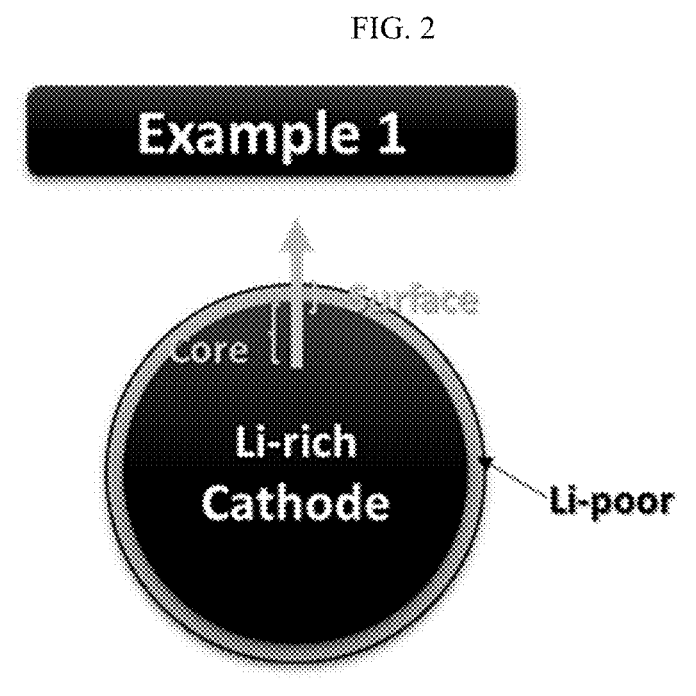

For example, the outside of the lithium composite oxide particle may be depleted of lithium more than the inside thereof (FIG. 2).

For example, Li/M inside the lithium composite oxide particles may be 1.2 to 1.6, and Li/M outside the lithium composite oxide particles may be 0.1 to 0.9. In this case, the outside of the lithium composite oxide particles may have a spinel crystal structure.

As such, by coating the surface of the 2D structure inside the lithium composite oxide particles with the lithium manganese oxide having the 3D spinel structure, the mobility of lithium ions can be increased.

Figure 3:
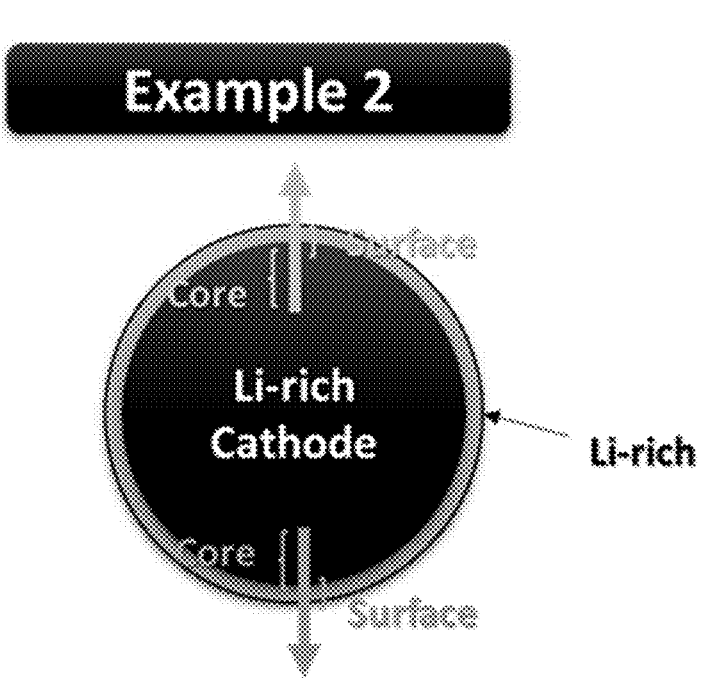
FIG. 3 is a conceptual diagram of a cathode active material according to Example 2 of the present invention.

In addition, for example, the outside of the lithium composite oxide particles may contain more excess lithium than the inside thereof (FIG. 3).

For example, Li/M inside the lithium composite oxide particles may be 1.2 to 1.6 and Li/M outside the lithium composite oxide particles may be 1.8 to 2.5. In this case, the outside of the lithium composite oxide particles may have a layered crystal structure.

As described above, by coating the outside of the particles with lithium-rich lithium manganese oxide, the capacity of the coating layer can be increased, so the charge capacity and discharge capacity can be increased.

For example, the lithium composite oxide particles may have an increasing or decreasing lithium concentration gradient from the inside to the outside thereof.

In the present invention, by adding Li after coating with a Mn-containing material, a concentration gradient can be formed while a spinel crystal structure or a layered structure having an excess of lithium can be formed.

For example, the molar concentration of manganese in the coating layer formed outside the lithium composite oxide particles may be different from the molar concentration of manganese inside the lithium composite oxide particles.

For example, the concentration of manganese outside the lithium composite oxide particles may be decreased compared to inside the lithium composite oxide particles.

For example, the concentration of manganese outside the lithium composite oxide particles may be increased compared to inside the lithium composite oxide particles.

For example, the lithium composite oxide particles may have a decreasing or increasing manganese concentration gradient from the inside to the outside thereof.

For example, the lithium composite oxide particles may include secondary particles formed by agglomeration of primary particles.

As a more preferable example, the dopant acting as a flux is mixed during calcination with a lithium compound, followed by heat treatment, thereby increasing the size of the primary particles, solving the problems of reduction in discharge capacity and voltage decay, and improving density of the cathode active material.

For example, the ratio of primary particles having a size greater than 300 nm to not greater than 10 μm to the total volume of primary particles included in the secondary particles may be adjusted to 50 to 100% by volume, 70 to 100% by volume, or 100% by volume.

For example, the ratio of primary particles having a size greater than 500 nm to not greater than 10 μm to the total volume of primary particles included in the secondary particles may be adjusted to 50 to 100% by volume, 70 to 100% by volume, or 100% by volume.

For example, the ratio of primary particles having a size greater than 1 μm to not greater than 10 μm to the total volume of primary particles included in the secondary particles may be adjusted to 50 to 100% by volume, 70 to 100% by volume, or 100% by volume.

In this case, the size of the primary particles means the maximum length of the particles.

The average particle diameter of the primary particles of the cathode active material may be adjusted to greater than 500 nm to not greater than 10 μm, or 1 μm to 10 μm.

The average particle diameter of the secondary particles of the cathode active material may be adjusted to 2 μm to 20 μm.

The average particle diameter may be defined as a particle size corresponding to 50% of the cumulative volume in a particle size distribution curve of the particles.

In a more preferable embodiment, the size of primary particles is increased so as to increase the parts corresponding to single crystals. In this case, as the number of parts corresponding to the single crystal structure increases, that is, as the number of primary particles decreases, the problem of voltage decay in polycrystals can be further solved. In addition, by controlling the size of primary particles, the specific surface area of the cathode active material can be reduced and thus problems of side reactions with an electrolyte can be solved.

In the present invention, the expression "causing the growth of primary particles" includes all concepts of nucleation, Ostwald ripening, and particle aggregation.

For example, the full width at half maximum (FWHM (deg.)) at I (104) in XRD analysis of the cathode active material can be adjusted to 0.1 to 0.25 (deg.) by controlling the size of primary particles through addition of the dopant M1 and control of the content thereof.

For example, the energy density per unit volume (Wh/L) of the cathode active material can be adjusted to 2.7 to 4.0 (Wh/L) by controlling the size of primary particles through addition of the dopant M1 and control of the content thereof.

For example, the specific surface area (BET, $m^2/g$) of the cathode active material can be adjusted to 0.01 to 2 (BET, $m^2/g$) by controlling the size of primary particles through addition of the dopant M1 and control of the content thereof.

However, the lithium ion diffusion distance increases when the size of primary particles increases, so there is a problem in that overpotential is generated due to concentration polarization of lithium ions during charging and discharging. As a result, kinetics may be lowered and thus the capacity of the cathode active material may be reduced. Accordingly, the present invention is capable of solving these problems by designing the lithium concentration or the metal concentration to be excessive or insufficient on the particle surface or by forming a concentration gradient.

The method for preparing a cathode active material according to an embodiment of the present invention includes a first step of forming precursor particles for forming an inside of the cathode active material.

The formation of the precursor particles may be performed using co-precipitation, spray-drying, solid-phase reaction, wet grinding, fluidized bed drying, or vibration drying, but is not particularly limited thereto.

The method may further include, after the first step and before the second step, washing the formed precursor particles with water, followed by drying.

The method may further include, after the first step and before the second step, roasting the formed precursor particles at 300 to 600° C.

Then, the method further includes, after the first step, a second step of mixing the formed precursor particles with a lithium compound and performing primary heat-treatment.

At this time, the primary heat-treatment temperature may be 700 to 900° C.

In a more preferable embodiment, in the primary heat-treatment step, a compound containing M1 of Formula 1 may be further mixed and heat-treated.

The method includes, after the second step, a third step of dispersing the primarily heat-treated particles in distilled water or an alkaline aqueous solution and then coating the particles with a compound containing manganese to form an outside of the cathode active material.

For example, after the third step and before the fourth step, the method may further include washing with water and drying.

After the third step, the method includes a fourth step of mixing the coated particles with a lithium compound and performing secondary heat treatment.

At this time, the secondary heat-treatment temperature may be 400 to 700° C.

For example, after the fourth step, the method may further include washing with water and drying.

A secondary battery according to an embodiment of the present invention includes the cathode active material.

The cathode active material is the same as described above, and the binder, conductive material, and solvent are not particularly limited, as long as they can be used for a cathode current collector of a secondary battery.

The lithium secondary battery may specifically include a cathode, an anode facing the cathode, and an electrolyte between the cathode and the anode, but is not limited to this configuration, as long as it can be used as a secondary battery.

Hereinafter, a cathode active material according to an embodiment of the present invention will be described in detail.

<Example 1> Formation of Lithium-Deficient Lithium Manganese Oxide Having Spinel Structure

Outside

Inside Synthesis

A spherical $Ni_{0.2}Co_{0.1}Mn_{0.7}CO_3$ precursor was synthesized using a co-precipitation method. 25 wt % of $NaCO_3$ and 28 wt % of $NH_4OH$ were added to a 2.5M composite transition metal sulfate solution prepared by mixing $NiSO_4 \cdot 6H_2O$, $CoSO_4 \cdot 7H_2O$, and $MnSO_4 \cdot H_2O$ at a molar ratio of 20:10:70 in a 90 L reactor. At this time, the pH in the reactor was maintained at 10.0 to 12.0, and the temperature thereof was maintained at 45 to 50° C. In addition, $N_2$, which is an inert gas, was injected into the reactor to inhibit oxidation of the prepared precursor. After completion of synthesis, washing and dehydration were performed using a filter press (F/P). Finally, the dehydrated product was dried at 120° C. for 2 days and filtered through a 75 μm (200 mesh) sieve to obtain a $Ni_{0.2}Co_{0.1}Mn_{0.7}CO_3$ precursor having a size of 18 μm and 4 μm.

Roasting

The precursor was maintained in an $O_2$ or air (50 L/min) atmosphere in a box furnace, and the temperature was elevated at a rate of 2° C./min and maintained at a calcination temperature of 550° C. for 1 to 6 hours, followed by furnace cooling.

First Heat Treatment

LiOH or $Li_2CO_3$ was weighed such that the precursor had a Li/M ratio of 1.45, and 0.6 mol % of Nb2O5 was weighed as a flux dopant, followed by mixing using a manual mixer (MM). The mixture was maintained under an $O_2$ or air (50 L/min) atmosphere in a box furnace, heated at 2° C./min, and maintained at a calcination temperature of 900° C. for 7 to 12 hours, followed by furnace cooling.

Outside Synthesis

The surface of the calcined product was coated with 5 mol % of Mn by co-precipitation. The active material and distilled water were weighed at a weight ratio of 1:2, the active material was dispersed in distilled water, and then an aqueous metal sulfate solution in which $MnSO_4 \cdot H_2O$ was dissolved in distilled water was added thereto. At this time, the pH was maintained at 10.0 to 12.0 using NaOH. After coating, the resulting product was washed and dehydrated using a filter press (F/P) and then dried at 150° C. for 14 hours.

Second Heat Treatment

Then, LiOH or $Li_2CO_3$ was weighed such that the wet-coated product had a Li/M ratio (the amount of coating) of 0.5 to 0.8, followed by mixing using a mixer. The mixture was maintained under an $O_2$ or air (50 L/min) atmosphere in

9 a box furnace, heated at 4° C./min, and maintained at a calcination temperature of 450° C. for 7 to 12 hours, followed by furnace cooling.

<Example 2> Formation of Lithium-Rich Lithium Manganese Oxide Having Layered Structure Outside A cathode active material was prepared in the same manner as in Example, except that, in the secondary heat treatment step, LiOH or $Li_2CO_3$ was weighed such that the wet-coated product had a Li/M ratio (the amount of coating) of 2.0 and the secondary heat treatment was performed at 600° C.

<Comparative Example> Non-Formation of Lithium Manganese Oxide Outside

A cathode active material was prepared in the same manner as in Example 1 except that the outside synthesis and the secondary heat treatment of Example 1 were not performed.

<Production Example> Production of Lithium Secondary Battery 90 wt % of each of the cathode active materials according to Examples and Comparative Example, 5.5 wt % of carbon black, and 4.5 wt % of a PVDF binder were dispersed in 30 g of N-methyl-2 pyrrolidone (NMP) to prepare a cathode slurry. The cathode slurry was applied to a 15 μm-thick aluminum (Al) thin film, which is a cathode current collector, dried, and then roll-pressed to produce a cathode. The loading amount of the cathode was 5.5 mg/cm$^2$ and the electrode density was 2.3 g/cm$^3$.

For the cathode, metallic lithium was used as a counter electrode, and a mixture of 1M $LiPF_6$ and EC/DMC (1/1, v/v) was used as an electrolyte.

A separator formed of a porous polyethylene (PE) film was injected between the cathode and the anode to form a battery assembly, and the electrolyte was injected into the battery assembly to produce a lithium secondary battery (coin cell).

Experimental Example

As can be seen from SEM analysis of FIG. 1, the cathode active materials according to Examples have a configuration in which the surface of overlithiated oxide particles having a layered structure and an increased primary particle size is uniformly coated with lithium manganese oxide.

Figure 4:
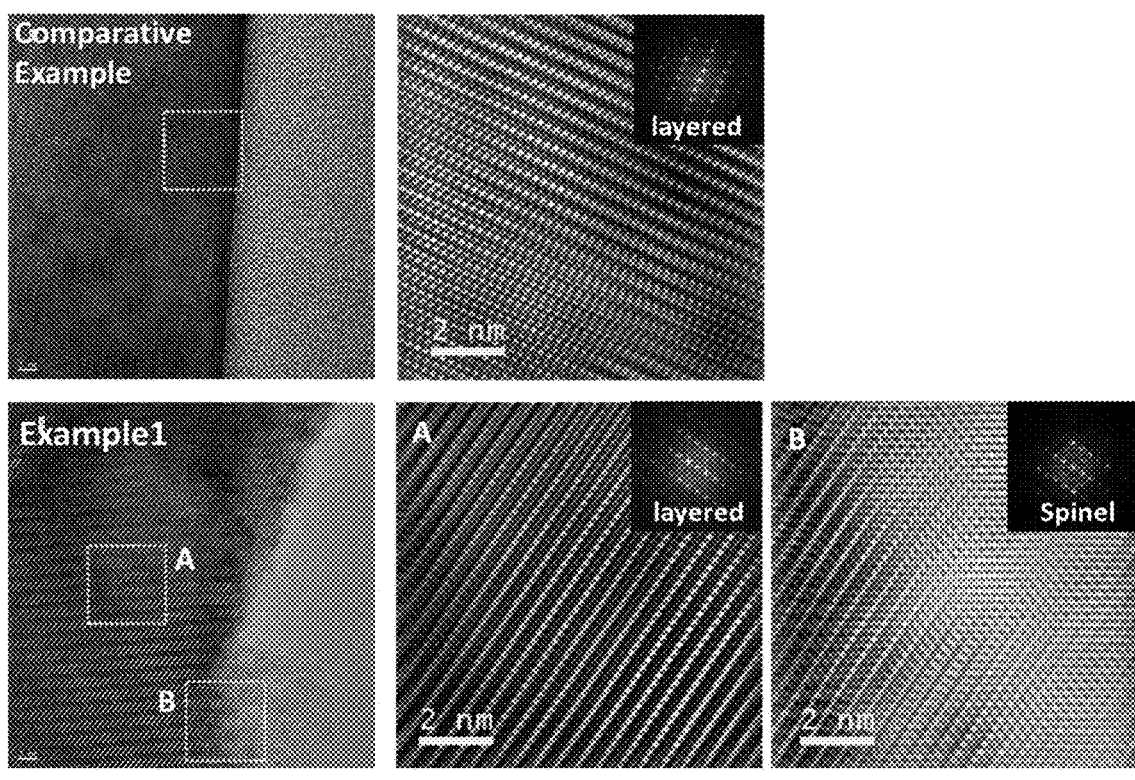
FIG. 4 shows TEM images of cathode active materials according to Comparative Example and Example of the present invention.

As can be seen from TEM analysis of FIG. 4, the cathode active material according to Example 1 has a configuration in which lithium manganese oxide having a spinel structure is formed on the surface of the overlithiated oxide particles having a layered structure.

Figure 5:
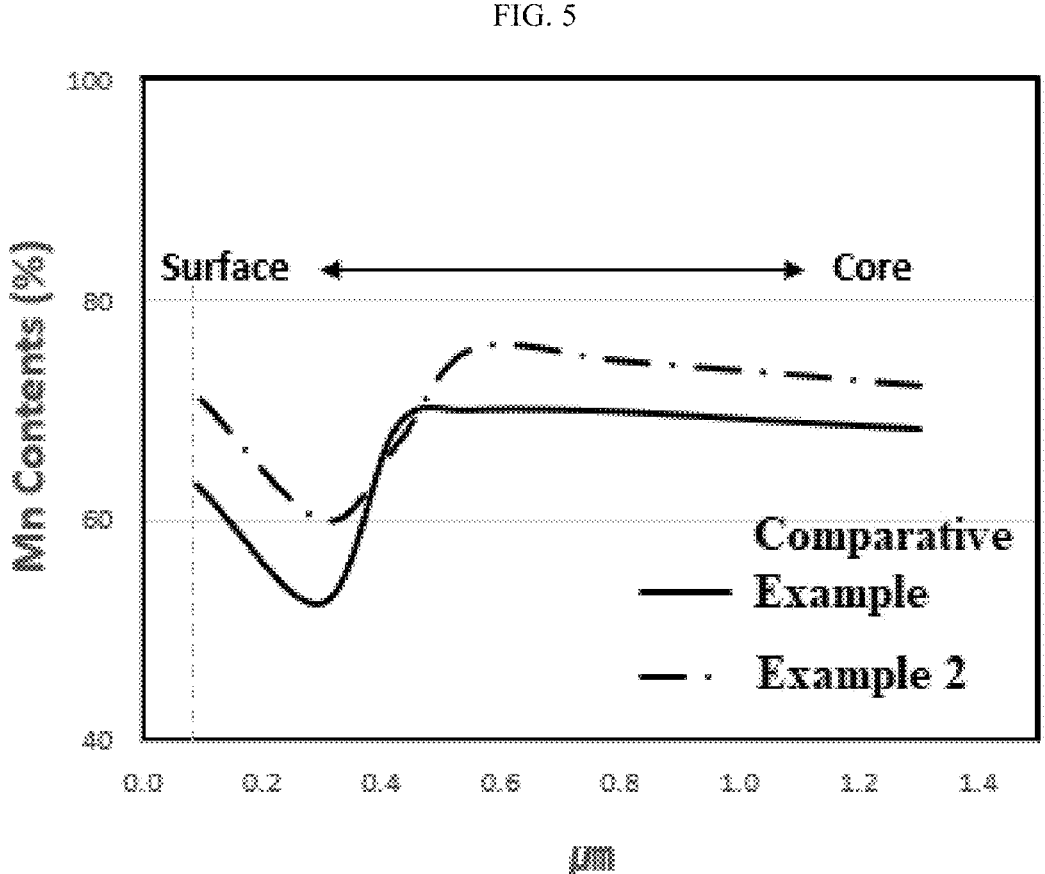
FIG. 5 shows the result of EDS performed on the cathode active material according to Example of the present invention.

The line-EDS analysis of FIG. 5 is a method of analyzing a change in the concentration of a metal through application of a voltage to the surface of a particle. It can be seen that a manganese concentration gradient is formed from the inside to the outside of the lithium composite oxide particles. In addition, it can be seen that Example 2 has a higher surface Mn content than that of Comparative Example.

Figure 6:
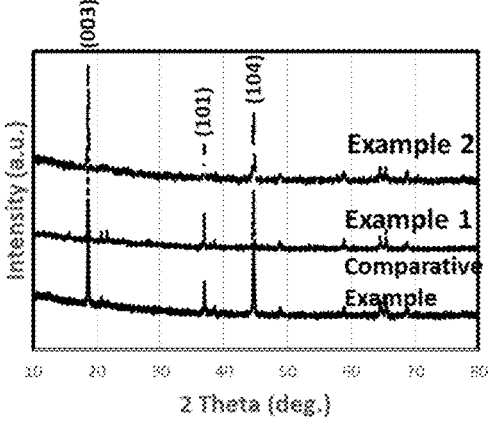
FIG. 6 shows the results of XRD analysis performed on cathode active materials according to Comparative Example and Example of the present invention.
Figure 6:
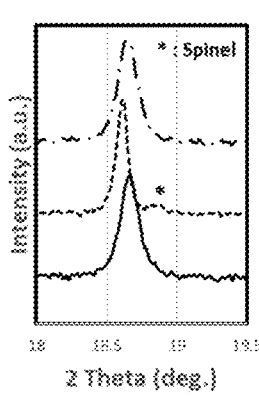
Figure 6:
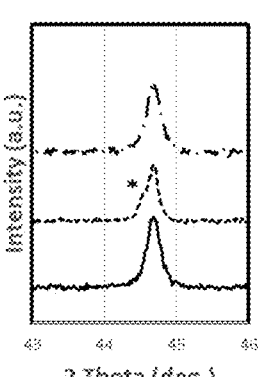

As can be seen from XRD analysis of FIG. 6, lithium manganese oxide having a spinel structure is formed in the cathode active material according to Example 1.

10

Figure 7:
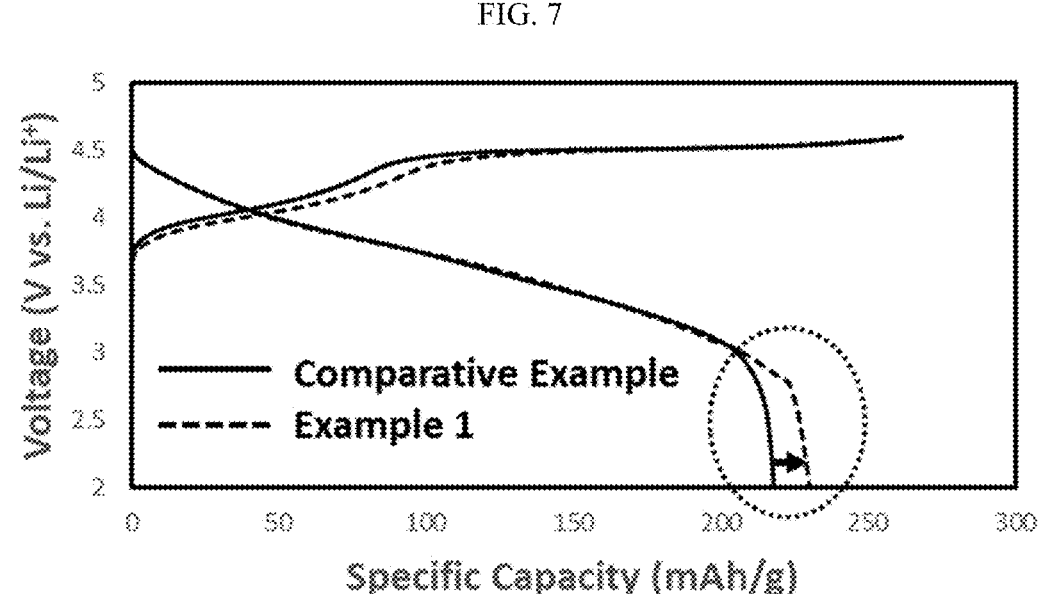
FIGS. 7 to 8 compare the charge/discharge capacities between secondary batteries according to Comparative Example and Example of the present invention.

As can be seen from FIG. 7, the cathode active material of Example 1 has increased discharge capacity compared to Comparative Example. This is because lithium ion mobility is accelerated due to the 3D spinel structure coated on the surface of 2D structure.

Figure 8:
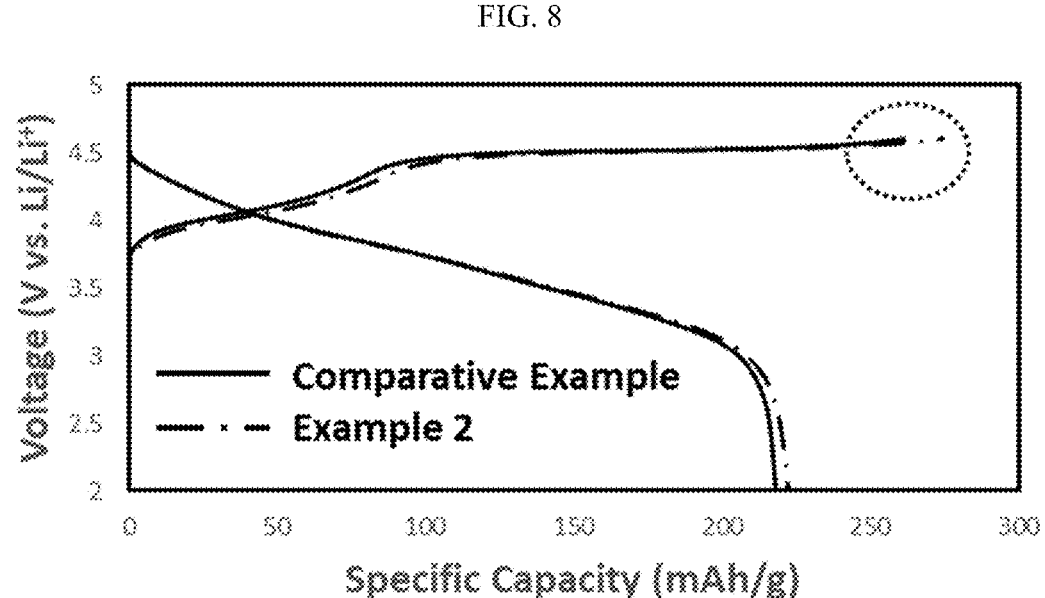

As can be seen from FIG. 8, the cathode active material of Example 2 has increased charge capacity compared to Comparative Example. This is because the coated $Li_2MnO_3$ contributes to increased capacity during initial charging. In addition, it can be seen that not only the charging capacity but also the discharging capacity are increased.

Figure 9:
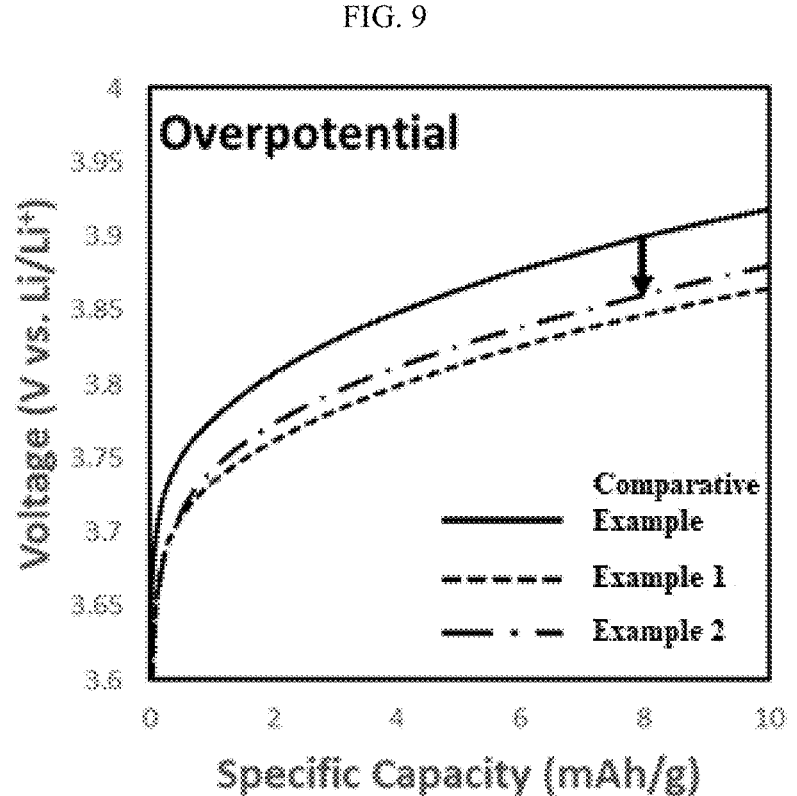
FIG. 9 shows a comparison in overvoltage between secondary batteries according to Comparative Example and Examples of the present invention.

As can be seen from FIG. 9, the overvoltage of the cathode active materials of Examples of the present invention is greatly reduced compared to Comparative Example. This is because the lithium ion conductivity is improved due to the material coated on the surface.

Figure 10:
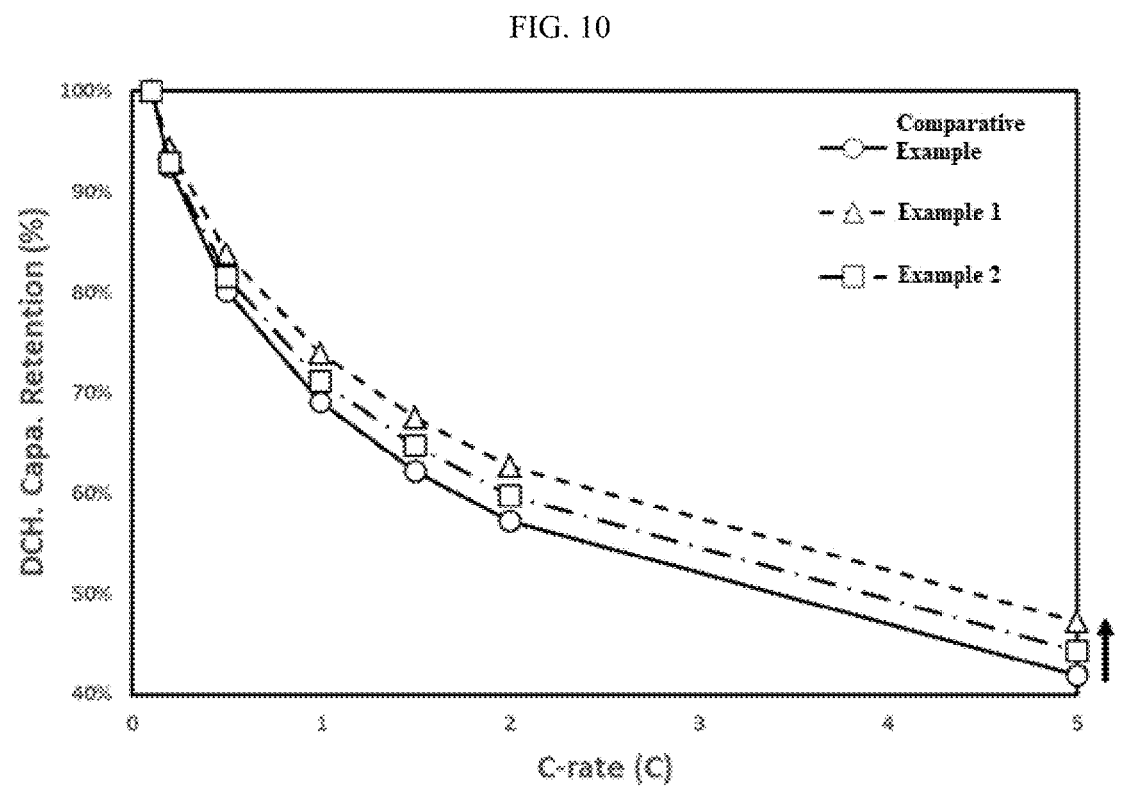

As can be seen from FIG. 10, the cathode active materials of Examples of the present invention have improved rate characteristics compared to Comparative Example. This is because lithium ion conductivity is improved due to the material coated on the surface.

Figure 11:
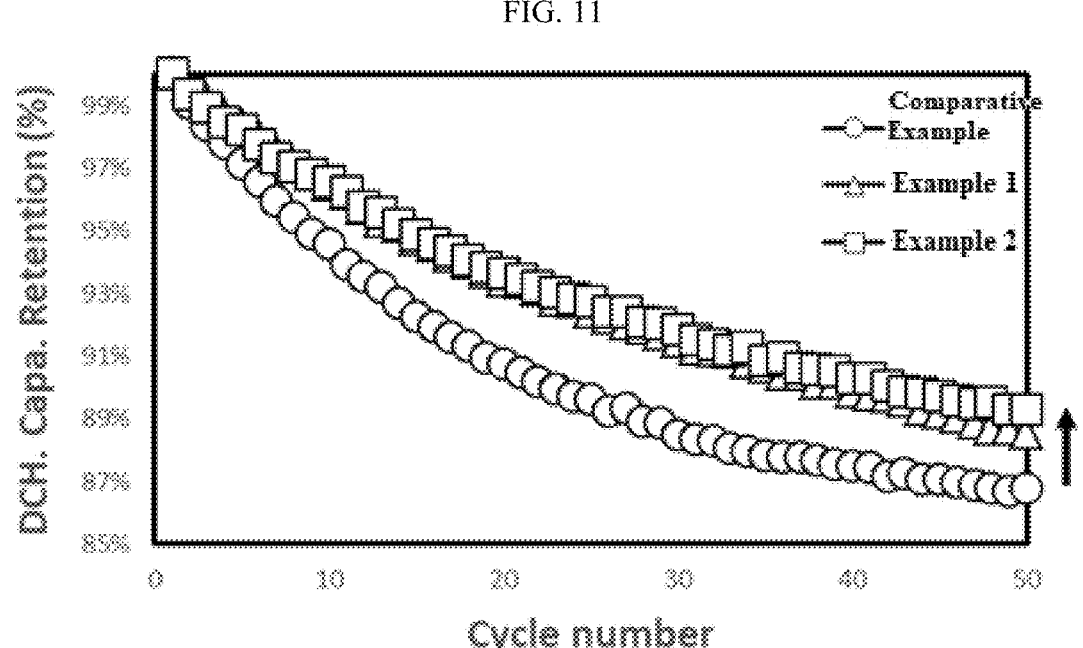
FIG. 11 shows a comparison in capacity retention rate between secondary batteries according to Comparative Example and Examples of the present invention.

As can be seen from FIG. 11, the cathode active materials of Examples of the present invention have improved lifetime characteristics compared to Comparative Example. This is because phase transition during cycling was alleviated due to the material coated on the surface.

Figure 12:
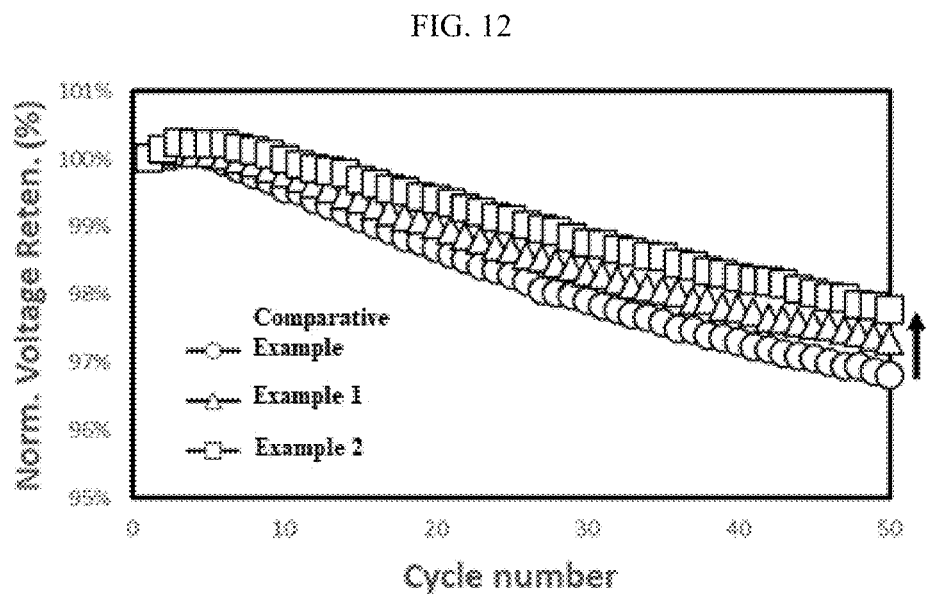

As can be seen from FIG. 12, the cathode active materials of Examples of the present invention suppress the voltage decay compared to Comparative Example. This is because lithium mobility is increased and the phase transition occurring during cycling is alleviated due to the 3D spinel structure coated on the surface in Example 1 and $Li_2MnO_3$ coated on the surface in Example 2.

The experimental results are shown in Table 1 below.

TABLE 1

| Item | | | Comparative Example | Example 1 | Example 2 |
|---|---|---|---|---|---|
| Initial (@25° C.) 0.1 C 2.0-4.6 V | CH. | mAh/g | 261.6 | 261.8 | 274.5 |
| | DCH. | | 218.2 | 230.5 | 222.6 |
| | Eff. | % | 83.4 | 88.0 | 81.1 |
| Rate characteristics 5 C/0.1 C | Rate | | 41.9 | 47.2 | 44.4 |
| Lifetime (@25° C.) 1 C/1 C 2.0-4.6 V | Cycle Life (50 cycle) | | 86.8 | 88.5 | 89.3 |
| | Voltage Decay (50 cycle) | | 96.8 | 97.3 | 97.8 |

The invention claimed is:

1. A cathode active material for a secondary battery comprising:

lithium composite oxide particles;

overlithiated oxide represented by Formula 1 below and having a layered crystal structure inside the lithium composite oxide particles; and lithium manganese oxide represented by Formula 2 below outside the lithium composite oxide particles, wherein, when a ratio of a number of moles of lithium (Li) to a total number of moles of metal (M) excluding lithium is defined as Li/M, the overlithiated oxide comprised inside the lithium composite oxide particles and the lithium manganese oxide comprised outside the lithium composite oxide particles have different values of Li/M, $$rLi_2MnO_3 \cdot (1-r)Li_aNi_xCo_yMn_zM1_{1-(x+y+z)}O2 \qquad \text{[Formula 1]}$$

wherein r, a, x, y, and z satisfy $0 < r \leq 0.6$, $0 < a \leq 1$, $0 \leq x \leq 1$, $0 < y < 1$, $0 \leq z < 1$, and $0 < x + y + z < 1$, and M1 comprises at least one selected from Ba, Sr, P, Y, Zr, Nb, Mo, Ta, or W, $$Li_bMn_pO_q \qquad \text{[Formula 2]}$$

wherein b, p and q satisfy $0.1 \leq b/p \leq 2.5$, and $0 < q \leq 15$, wherein a Li/M ratio inside the lithium composite oxide particles is 1.1 to 1.6, and wherein:

a) a Li/M ratio outside the lithium composite oxide particles is from 0.1 to 0.9, and the outside of the lithium composite oxide particles has a spinel crystal structure; or b) a Li/M ratio outside the lithium composite oxide particles is from 1.8 to 2.5, and the outside of the lithium composite oxide particles has a layered crystal structure.

2. The cathode active material for a secondary battery according to claim 1, wherein the lithium composite oxide particles have a lithium concentration gradient from an inside to an outside of the lithium composite oxide particles.

3. The cathode active material for a secondary battery according to claim 1, wherein a ratio (Mn/Ni) of a number of moles of manganese (Mn) to a total number of moles of nickel (Ni) inside the lithium composite oxide particles is 1 to 4.5.

4. The cathode active material for a secondary battery according to claim 1, wherein the lithium composite oxide particles have a manganese concentration gradient from an inside to an outside of the lithium composite oxide particles.

5. The cathode active material according to claim 1, wherein the lithium composite oxide particles comprise secondary particles formed by agglomeration of primary particles, and M1 of Formula 1 is a dopant acting as a flux for growing the primary particles.

6. The cathode active material according to claim 1, wherein the lithium composite oxide particles comprise secondary particles formed by agglomeration of primary particles, and primary particles having a size of 300 nm to 10 μm are present in an amount of 50 to 100 vol % based on a total amount of the primary particles comprised in the secondary particles.

7. A method of preparing the cathode active material for a secondary battery according to claim 1, the method comprising:

forming precursor particles for forming an inside of the cathode active material;

mixing the formed precursor particles with a lithium compound and performing primary heat treatment;

dispersing the primary heat-treated particles in distilled water or an alkaline aqueous solution and then coating the particles with a compound containing manganese to form an outside of the cathode active material; and mixing the coated particles with a lithium compound and performing secondary heat treatment.

8. The method according to claim 7, wherein, in the primary heat treatment, a compound containing M1 of Formula 1 is further mixed and heat-treated.

9. A secondary battery comprising the cathode active material according to claim 1.

\* \* \* \* \*